Patented Nov. 28, 1922.

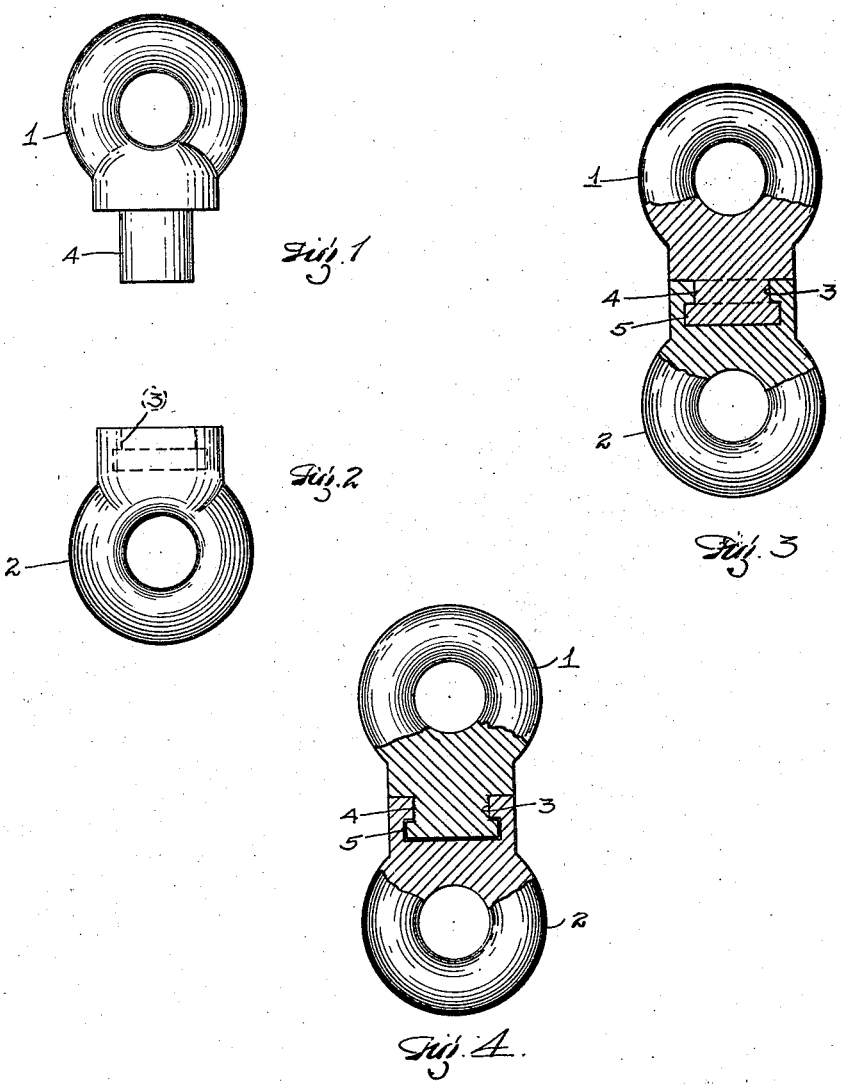

1,437,144

UNITED STATES PATENT OFFICE.

JOHN ISAACSON, OF SEATTLE, WASHINGTON.

METHOD OF MAKING SWIVELS.

Application filed July 15, 1920. Serial No. 396,444.

*To all whom it may concern:*

Be it known that I, JOHN ISAACSON, a citizen of the United States, and a resident of Seattle, county of King, and State of Washington, have invented a new and useful Improvement in Methods of Making Swivels, of which the following is a specification, the principle of the invention being herein explained and the best mode in which I have contemplated applying that principle, so as to distinguish it from other inventions.

The present improvements relate more particularly to the manufacture of swivels such as are used to secure together the ends of ropes or cables, whether of wire or other material. Such swivel regularly consists of two ring-like parts formed with lateral projections, the one such projection being provided with an undercut circular recess, and the other being provided with a collared stud rotatably fitted in such recess. This type of swivel has heretofore been made by casting. According to one method, the male part has been cast with the collared stud and this is then inserted in a mold, and the female part cast around it; however, it has been possible to make a swivel in this fashion only with brass or bronze, as cast iron or steel will not swivel after being cast in this manner. According to another method, the male part is made as just described and the female part is made with a recess or opening large enough to receive the collar on the stud of the male part, the portions surrounding such recess or opening being then heated, the collared stud inserted, and such heated portion of such female part pressed around the stud back of the collar.

Aside from such cast brass or bronze swivels being very expensive they are too soft and do not have sufficient tensile strength to stand up under the loads to which they are subjected. While cast steel swivels made in the fashion described are stronger, a great deal of trouble is encountered in assembling the parts, and it quite frequently happens that the female part is cut off at the foot of the outside collar. In any event, the material is distorted and strains are set up that tend to weaken the device.

The object of the present invention, accordingly, is to provide an improved method for making a swivel of this type out of steel, or equivalent metal of high tensile strength, whereby not only will a freely turning swivel be provided but one free from hidden defects and able to stand up under excessive strains. To the accomplishment of the foregoing and related ends, the invention, then, consists of the steps hereinafter fully described and particularly pointed out in the claim, the annexed drawing and the following description setting forth but one of the ways in which the principle of the invention may be carried out.

In said annexed drawing:—

Fig. 1 is a side elevation of the male part of a swivel previous to assembly in accordance with my improved method; Fig. 2 is a similar view of the female part; Fig. 3 is a view partly in section showing the two parts as preliminarily assembled; and Fig. 4 is a view similar to Fig. 3 but showing the parts in the swivel as finished.

In carrying out my improved method of manufacturing swivels of the type in hand, both the male part 1 and the female part 2 are first drop-forged from suitable steel stock. The female part is then bored out and recessed to form an undercut circular opening 3, as shown in dotted outline in Fig. 2 The stud 4 on the male part is turned so that it will just pass into the neck of such recess 3, and is of a length greater than the depth of said recess so as to provide an excess of material for the purpose presently to be explained.

Preliminarily to assembling the parts the outer portion of the stud 4 is heated to a high temperature, i. e., one at which the metal will upset under pressure. Thereupon such stud is inserted in the recess 3 of the female part and the two parts are pressed together longitudinally of the axis of the stud and such recess under a heavy pressure so that the heated portion of the stud will be upset and fill the undercut portion of the recess. The amount of excess material in the stud is gauged so that the recess will be thus filled quite completely, as shown in Fig. 3, which illustrates this stage in the manufacture of the swivel. After cooling, however, the heated end of the stud, thus upset to fill the uncut portion of the recess, will contract sufficiently so as to leave the stud free to turn in such recess. In other words, the parts are then loose to swivel readily.

Not only is my improved method thus seen to be simple and easy to carry out, but the resultant product realizes the maximum strength of the materials entering into the construction. At the same time the parts freely swivel, one upon the other.

Other forms may be employed embodying the features of my invention instead of the one here explained, change being made in the form of construction, provided the elements stated by the following claim or the equivalent of such stated elements be employed, whether produced by my preferred method or by others embodying steps equivalent to those stated in the following claim.

I therefore particularly point and distinctly claim as my invention:—

In a method of making a swivel of the character described, the steps which consist in forming a female part with an undercut circular recesss, forming a male part with a stud adapted to snugly fit the neck of such recess and of a length greater than the depth of such recess, heating the end-portion of such stud to a high temperature, inserting same in such recess, subjecting the parts to heavy pressure while the end of said stud is at a high temperature, whereby such heated end-portion of such stud is upset and caused to fill the undercut portion of such recess, and thereupon cooling the parts, so that the heated end of the stud thus upset will contract so as to be free to turn in said recess.

Signed by me, this 8th day of July, 1920.

JOHN ISAACSON.